Patented Oct. 17, 1922.

1,432,364

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed March 19, 1921. Serial No. 453,721.

*To all whom it may concern:*

Be it known that I, RAY L. STINCHFIELD, a citizen of the United States of America, residing at Rochester, in the county of Monroe and State of New York, have invented certain new and useful Improvements in Cellulose-Ether Solvents and Compositions (Case A), of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in the lower monohydroxy aliphatic alcohols, it has been found that such solvents by themselves will not dissolve a sufficient proportion of the ethers to make a desirably thick flowable composition or dope, such as may be used in the manufacture of photographic film base by the customary methods, or in the other plastic arts.

I have discovered that an adequately strong and useful solvent may be prepared by mixing one or more of the lower monohydroxy aliphatic alcohols with tetrachloroethane ($CHCl_2$—$CHCl_2$). While the proportions may vary widely, I find a useful range to be, by way of illustration, 80 to 3 parts of the monohydroxy aliphatic alcohol and 20 to 97 parts by weight of tetrachloroethane. When the alcohol is above 80% of the mixture and sufficient cellulose ether is dissolved therein, there may be obtained, instead of a flowable film-forming composition a mixture which is useful for moulding and similar plastic manipulations.

While the amount of cellulose ether dissolved in my compound solvents may vary considerably, it is noted, by way of illustration, that 10 parts of water-insoluble ethyl cellulose dissolved in a mixture of 45 parts by weight of tetrachloroethane and 15 parts of methyl alcohol yields a flowable film-forming composition. As a further illustration, it is noted that a viscous film-forming composition, suitable for use in the customary machinery, can be made by dissolving 10 parts of water-insoluble ethyl cellulose in 30 parts of tetrachloroethane and 30 parts of ethyl alcohol. When the film is formed, the alcohol evaporates much more rapidly than the tetrachloroethane, and the latter remains in considerable quantities in the film, imparting useful properties to it. Not only does it tend to diminish even the small combustibility of the cellulose ether-film but it adds additional suppleness to the latter. The alcohols tend to avoid pitting or wrinkling of the film, due to their co-operation with the less volatile tetrachloroethane. Moreover, they hasten the setting of the film in the standard film-manufacturing machinery.

The ingredients are of the ordinary commercial type, sufficiently purified for the process of film manufacture, so as to give a dope yielding films having the proper relative freedom from color. While I prefer to employ methyl or ethyl alcohol, or a mixture of them, the other lower monohydroxy aliphatic alcohols, isopropyl alcohol, propyl alcohol, butyl alcohol (normal, iso and secondary) and fusel oil are also useful to a considerable degree in connection with tetrachloroethane.

Having thus described my invention, what I claim as new and desire to secure by Letters Patent is:

1. A compound solvent for ethers of cellulose, comprising a mixture of tetrachloroethane and a lower monohydroxy aliphatic alcohol.

2. A compound solvent for alkyl ethers of cellulose, comprising from 97 to 20 parts of tetrachloroethane and 3 to 80 parts of a lower monohydroxy aliphatic alcohol.

3. A compound solvent for water-insoluble alkyl cellulose, comprising tetrachloroethane and methyl alcohol.

4. A viscous composition comprising a strong solution of alkyl ether of cellulose in a mixture of tetrachloroethane and a lower monohydroxy aliphatic alcohol.

5. A viscous flowable film-forming composition, comprising an alkyl ether of cellulose dissolved in a compound solvent containing 97 to 20 parts by weight of tetrachloroethane and 3 to 80 parts by weight of a lower monohydroxy aliphatic alcohol.

6. A composition of matter comprising 10 parts of water-insoluble ethyl cellulose and a compound solvent containing approximately 45 parts of tetrachloroethane and 15 parts of methyl alcohol.

7. A composition of matter comprising an ether of cellulose dissolved in tetrachloroethane and a co-solvent.

Signed at Rochester, New York, this 16th day of March, 1921.

RAY L. STINCHFIELD.